(12) United States Patent
Ma et al.

(10) Patent No.: US 8,312,070 B2
(45) Date of Patent: Nov. 13, 2012

(54) SPEED-LEVEL CALCULATOR AND CALCULATING METHOD FOR DYNAMIC VOLTAGE SCALING

(75) Inventors: Yung-Cheng Ma, Hsinchu (TW); I-Yen Chen, Kaohsiung (TW); Yen-Tun Peng, Taipei (TW); Chi-Lung Wang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 1303 days.

(21) Appl. No.: 12/034,109

(22) Filed: Feb. 20, 2008

(65) Prior Publication Data

US 2009/0106335 A1        Apr. 23, 2009

(30) Foreign Application Priority Data

Oct. 17, 2007   (TW) .............................. 96138874 A

(51) Int. Cl.
*G06F 7/00*   (2006.01)
*G06F 15/00*  (2006.01)
*G06F 1/00*   (2006.01)
*G06F 1/26*   (2006.01)
*G06F 1/32*   (2006.01)

(52) U.S. Cl. ........ 708/200; 708/490; 708/620; 713/300; 713/320; 713/322

(58) Field of Classification Search .................... 708/620
See application file for complete search history.

(56) References Cited

U.S. PATENT DOCUMENTS

| 4,727,506 | A | * | 2/1988 | Fling | 708/551 |
| 6,501,304 | B1 |  | 12/2002 | Boerstler et al. | 327/99 |
| 6,529,930 | B1 | * | 3/2003 | Sazzad et al. | 708/552 |

(Continued)

FOREIGN PATENT DOCUMENTS

TW          I279074          4/2007

(Continued)

OTHER PUBLICATIONS

"Intel SpeedStep Technology". http://www.intel.com/support/processors/mobile/pentiumiii/sb/CS-007509.htm Date Created: Dec. 8, 2003, Last Modified: Apr. 6, 2007.

(Continued)

*Primary Examiner* — Chat Do
*Assistant Examiner* — Kevin G Hughes
(74) *Attorney, Agent, or Firm* — Lin & Associates IP, Inc.

(57) ABSTRACT

Disclosed is directed to a speed-level calculator and calculating method for dynamic voltage scaling. The speed-level calculator comprises a deadline counter, a shifter, and a fixed-point multiplier. The deadline counter calculates the residual time D from current time to each task deadline for completing an episode. The shifter generates a D' value by shifting the D value to the right for e-m bits, and takes the decimal fraction part of the D' value for m bits. The speed-level calculator further comprises a saturation control circuit to detect if an overflow occurs on the D' value. According to a pre-calculated parameter $\alpha_i$ corresponding to each task $T_i$, the fixed-point multiplier performs the multiplication of D' and $\alpha_i$. After completing saturation and rounding on the multiplication result, a corresponding clock period is generated by taking the integer part. This clock period is used as speed-level to switch the processor voltage and frequency.

16 Claims, 16 Drawing Sheets

U.S. PATENT DOCUMENTS

| | | | | |
|---|---|---|---|---|
| 6,927,605 | B2 | 8/2005 | Fetzer et al. | 327/101 |
| 6,944,229 | B2 | 9/2005 | Son et al. | 375/240.25 |
| 7,030,661 | B1 | 4/2006 | Doyle | 327/102 |
| 7,061,292 | B2 | 6/2006 | Maksimovic et al. | 327/277 |
| 7,069,461 | B1 | 6/2006 | Chan et al. | 713/501 |
| 7,131,015 | B2 * | 10/2006 | Flautner et al. | 713/320 |
| 2006/0104348 | A1 * | 5/2006 | Chen et al. | 375/240.01 |
| 2007/0011476 | A1 | 1/2007 | Flautner et al. | |

FOREIGN PATENT DOCUMENTS

| | | |
|---|---|---|
| TW | I287912 | 10/2007 |
| TW | I288582 | 10/2007 |

OTHER PUBLICATIONS

C. M. Krishna and Y-H Lee, "Voltage-Clock-Scaling Adaptive Scheduling Techniques for Low Power Hard Real-Time Systems.", IEEE Transactions on Copmuter, vol. 52, No. 12, Dec. 2003.

T. Okuma, T. Ishihara, and H. Yasuura, "Real-Time Task Scheduling for a Variable Voltage Processor," Proceedings of the International Symposium on System Synthesis, Nov. 1999.

T. Pering, T. Burd, and R. Brodersen, "Voltage Scheduling in the IpARM Microprocessor System," *Proceedings of the International Symposium on Low Power Electronics and Design*, Jul. 2000.

P. Pillai and K. G. Shin, "Real-time Dynamic Voltage Scaling for Low-Power Embedded Operating Systems," Proceedings of the 18th Symposium on Operating System Principles, Oct. 2001.

J. Pouwelse, K. Langendoen, and H. Sips, "Dynamic voltage scaling on a low-power microprocessor," *Proceedings of the International Conference on Mobile Computing and Networking* (MOBICOM-7), Jul. 2001.

Y. Shin and K. Choit, "Power Conscious Fixed Priority Scheduling for Hard Real-Time Systems," Proceedings of the 36th Annual Design Automation Conference, 1999.

K. Govil, E. Chan, and H. Wasserman, "Comparing Algorithms for Dynamic Speed-Setting of a Low-Power CPU," Proceedings of the First International Conference on Mobile Computing and Networking, Nov. 1995.

T. Pering, T. Burd, and R. Brodersen, "The Simulation and Evaluation of Dynamic Voltage Scaling Algorithms," Proceedings of International Symposium on Low Power Electronics and Design 1998, pp. 76-81, Jun. 1998.

M. Weiser, B. Welch, A. Demers, and S. Shenker, "Scheduling for Reduced CPU Energy," Proceedings of the First Symposium of Operating Systems Design and Implementation, Nov. 1994.

K. Flautner, S. Reinhardt, and T. Mudge, "Automatic Performance-Setting for Dynamic Voltage Scaling," Proceedings of the International Conference on Mobile Computing and Networking (MOBICOM-7), Jul. 2001.

J. Lorch and A. J. Smith, "Improving dynamic voltage scaling algorithms with PACE," Proceedings of the ACM SIGMETRICS 2001 Conference, Jun. 2001.

D. Grunwald, P. Levis, K. Farkas, C. B. Morrey III, and M. Neufeld, "Policies for Dynamic Clock Scheduling," Proceedings of the Fourth Symposium on Operating Systems Design & Implementation, Oct. 2000.

Krisztián Flautner and Trevor Mudge, "Vertigo: Automatic Performance-Setting for Linux," Proceedings of the 5th symposium on Operating systems design and implementation, OSDI 2002.

R. Xu, D. Moss, and R. Melhem, "Minimizing expected energy in real-time embedded systems," Proceedings of the 5th ACM international conference on Embedded software, (New York, NY, USA), pp. 251-254, ACM Press, 2005.

H. Aydin, R. Melhem, D. Mosse, and P. Mejia-Alvarez, "Power-aware scheduling for periodic real-time tasks," IEEE Transactions on Computers, vol. 53, No. 5, pp. 584-600, May, 2004.

S. A. McInerny and Y. Dai, "Basic Vibration Signal Processing for Bearing Fault Detection," IEEE Transactions on Education, vol. 46, No. 1, pp. 149-156, Feb. 2003.

* cited by examiner

Number of Bits

| n | 4 |
|---|---|
| f | e |

FIG. 9

| Clock Period $\tau_i$ | Frequency $f$ |
|---|---|
| 0100 | $f_{max}$ |
| 0101 | $(4/5) * f_{max}$ |
| 0110 | $(2/3) * f_{max}$ |
| 0111 | $(4/7) * f_{max}$ |
| 1000 | $(1/2) * f_{max}$ |
| 1001 | $(4/9) * f_{max}$ |
| 1010 | $(2/5) * f_{max}$ |
| 1011 | $(4/11) * f_{max}$ |
| 1100 | $(1/3) * f_{max}$ |

| Speed Level | Multiplier |
|---|---|
| 8 ($k=3$) | 7*7 |
| 16 ($k=4$) | 8*8 |
| 32 ($k=5$) | 9*9 |
| 64 ($k=6$) | 10*10 |

FIG. 15

SPEED-LEVEL CALCULATOR AND CALCULATING METHOD FOR DYNAMIC VOLTAGE SCALING

FIELD OF THE INVENTION

The present invention generally relates to a speed-level calculator and calculating method for dynamic voltage scaling (DVS).

BACKGROUND OF THE INVENTION

Dynamic voltage scaling (DVS) is a recent low-power technology for adjusting the processor speed according to the workload. When the system workload is low, the processor may operate at a lower voltage and clock frequency to save power. The goal of the DVS mechanism is to save total energy consumption while satisfying the efficiency demands by lowering the operation speed.

FIG. 1 shows a schematic view of an exemplary DVS. In FIG. 1, the upper figure is a curve of the workload vs. time. According to the workload curve, the operating system (OS) scales the CPU speed. The lower figure is a schematic view of the CPU operating at different voltage and frequency according to the different workload.

The realization of DVS system may be divided into two parts. The first part is the circuit technology to dynamically scale the voltage and operating frequency, including glitchless clock generator, phase-lock loop (PLL), and closed-loop voltage adjustment circuit. The second part is to match the performance setting of DVS by determining the CPU operation speed according to the workload. The algorithms of performance setting methods of the second part may be divided into three types. The first type is to determine the performance setting according to the usage context. The second type is to set performance according to the task deadline of a real-time kernel. The third type is to monitor past utilization to set the processor speed.

The LongRun technology in Transmeta Crusoe and the ARM intelligent energy management technology both use the third type of monitoring past utilization of the processor. This method records the past utilization of the processor as the basis for scaling the CPU operating frequency. The algorithm of this type is complicated and consumes much computation resource, and is thus not suitable for wireless sensor network (WSN) devices.

Many algorithms for DVS performance setting have been proposed. However, proposed algorithms may consume longer run time and need system resource that usually does not exist in a WSN-node. For a WSN-node with limited resource, the current DVS technology is not suitable because the WSN-node usually has only a simple micro-processor unit (MCU) and a small amount of memory, and does not even include a complete OS.

U.S. Pat. No. 7,131,015 disclosed a performance setting method for DVS proposed by ARM. The performance setting method uses the OS to detect a series of related events during execution, called an episode, and predicts the performance factor (PF) required for executing the episode according to historical record of a performance factor required by executing that episode.

Performance factor means the ratio of the current execution speed and the highest speed. For example, the highest speed of the CPU is 100 MHz, and the current clock rate of the CPU is 80 MHz, the PF is 0.8.

FIG. 2 shows an example illustrating the occurrence of an episode 200. As shown in FIG. 2, a user activates a ghostview window to read a postscript file. This event triggers a series of related events, including the system call of the OS to access an attached file, wake up a ghostview program to parse the attached file and render the edited document, and then activate the X-window server process to display the ghostview window. This series of events is an episode.

The performance setting method for DVS by ARM must modify the OS, and must use the intercept system call to dynamically detect the episode for the target of the performance setting. This method targets the past episodes to calculate the required PF, and then uses the historical record to predict the required PF in future execution of the episode. ARM will calculate the required PF after each episode execution. The equation for calculating performance factor $PF_j$ is as follows:

$$PF_j = \frac{Time_{full-speed} - Time_{idle}}{PerceptionThreshold - Time_{idle}}$$

where variable PerceptionThreshold may be viewed as the deadline for finishing the episode. In this example, variable PerceptionThreshold is set as 0.5 ms. When an episode is executed again, the system predicts required $PF_{prediction}$ according to $PF_j$ of the last n executions and the required execution time $Time_j$ at full-speed. The prediction equation is:

$$PF_{prediction} = \frac{\sum_{j=1}^{n} PF_j * Time_j}{\sum_{j=1}^{n} Time_j}$$

In this example, the performance setting method for DVS by ARM is to determine, during the execution, the required execution time is at least 20 ms at the CPU speed, and to detect the episode during the execution. The calculation of PF requires a floating-point adder, a multiplier and a divider. In other words, it requires a large amount of hardware and consumes much computational resource, and is not suitable for WNS-node with only limited resource.

R. Xu, et. al, published "Minimizing expected energy in real-time embedded system" in ACM International Conference on Embedded Software 2005, disclosing a theory to minimize the expected energy in a real-time embedded system. In the offline stage, the profiling approach is used to collect parameters $W_i$ and $P_i(x)$ for each task $T_i$, where parameter $W_i$ is the worse-case execution cycle of $T_i$, i.e. the maximum execution cycles that task $T_i$ may encounter, and parameter $P_i(x)$ is the probability that task $T_i$ executes x cycles. According to parameters $W_i$ and $P_i(x)$, a mathematical programming approach is used to solve the control parameter $\beta_i$ to control the execution of task $T_i$ at run time.

FIG. 3 shows an exemplary schematic view of the task model of the theory. The task model is designed for repeated periodic tasks. In each period, a series of tasks $\{T_1, T_2, \ldots, T_n\}$ are executed sequentially, and are required to complete before the deadline D.

FIG. 4 shows a schematic view of an exemplary operation of the task model. When executing a task $T_i$, the time allocated to task $T_i$ is $\beta_i * D'$, the ratio $\beta_i$ of the remaining time to deadline D'. The required clock frequency $f_i$ is set to guarantee that, even the worse case execution cycle $W_i$ is encountered, the task $T_i$ may still be completed in time $\beta_i*D'$. Clock frequency $f_i$ is set as follows:

$$f_i = \frac{W_i}{\beta_i * D'}$$

SUMMARY OF THE INVENTION

In an exemplary embodiment, the disclosed is directed to a speed-level calculator for dynamic voltage scaling, applicable to processor with plural speed levels. The exemplary speed-level calculator may comprise a deadline counter, a shifter, and a fixed-point multiplier. The deadline counter computes the residual time D of the deadline required to accomplish a series of related tasks. A shifter is used to compute $D'=(2^{-e}*D)$ from the residual time D and then rounds D' to the m bits after the decimal point, where e and m are both natural numbers. To preserve the m bits after the decimal point, the computation of D' is realized by shifting D to the right for e-m bits. In addition, the speed-level calculator may include a saturation control circuit for detecting whether an overflow occurs in the calculated speed-level. For each task $T_i$, the fixed-point multiplier multiplies D' with a pre-computed ratio $\alpha_i$. Saturation is then performed on the multiplication result and the integer part is taken as a discrete speed-level to generate the clock signal with required frequency and control the processor voltage.

In another exemplary embodiment, the disclosed is directed to a speed-level calculating method for dynamic voltage scaling. The speed-level calculating method comprises: computing the residual time D of the deadline required to accomplish a series of related tasks; shifting residual time D to the right for e-m bits to obtain $D'=(2^{-e}*D)$, rounded to the m bits after the decimal point, where e and m being both natural numbers; detecting whether an overflow occurs in D'; when no overflow occurring in D', pre-computing a ratio parameter $\alpha_i$ of each task $T_i$, and multiplying D' with $\alpha_i$, and the multiplication result being rounded as a k-bit integer, where k being a natural number. The k-bit integer multiplication result may be taken as a discrete speed-level to control the processor voltage and frequency. When overflow occurs on the multiplication result, the processor may be set to execute in the lowest available speed.

Based on the error theory analysis, the disclosed embodiments may control the hardware complexity as follows: if to compute the k-bit speed-level $\tau'$, without overflowing ($\tau<2^k$), and the computational error within the order of $2^{-p}$, where p is the error tolerance parameter, then the precision selection rule is as follows: (a) the number of bits after the decimal point for $\alpha_i$ is n=k+p+1; (2) the number of bits after the decimal point selected by (D>>e) is m=p+2, and (3) the size of the required multiplier is (k+p+2)*(k+p+2).

The disclosed exemplary embodiments may be used in a wireless sensor network (WSN) node.

The foregoing and other features, aspects and advantages of the present invention will become better understood from a careful reading of a detailed description provided herein below with appropriate reference to the accompanying drawings.

BRIEF DESCRIPTION OF THE DRAWINGS

FIG. 9 shows an exemplary record format of parameter $\alpha_i$, consistent with certain disclosed embodiments.
FIG. 15 shows an example of the relation between speed level and the required size of the multiplier, consistent with certain disclosed embodiments.

DETAILED DESCRIPTION OF THE PREFERRED EMBODIMENTS

Figure 5:
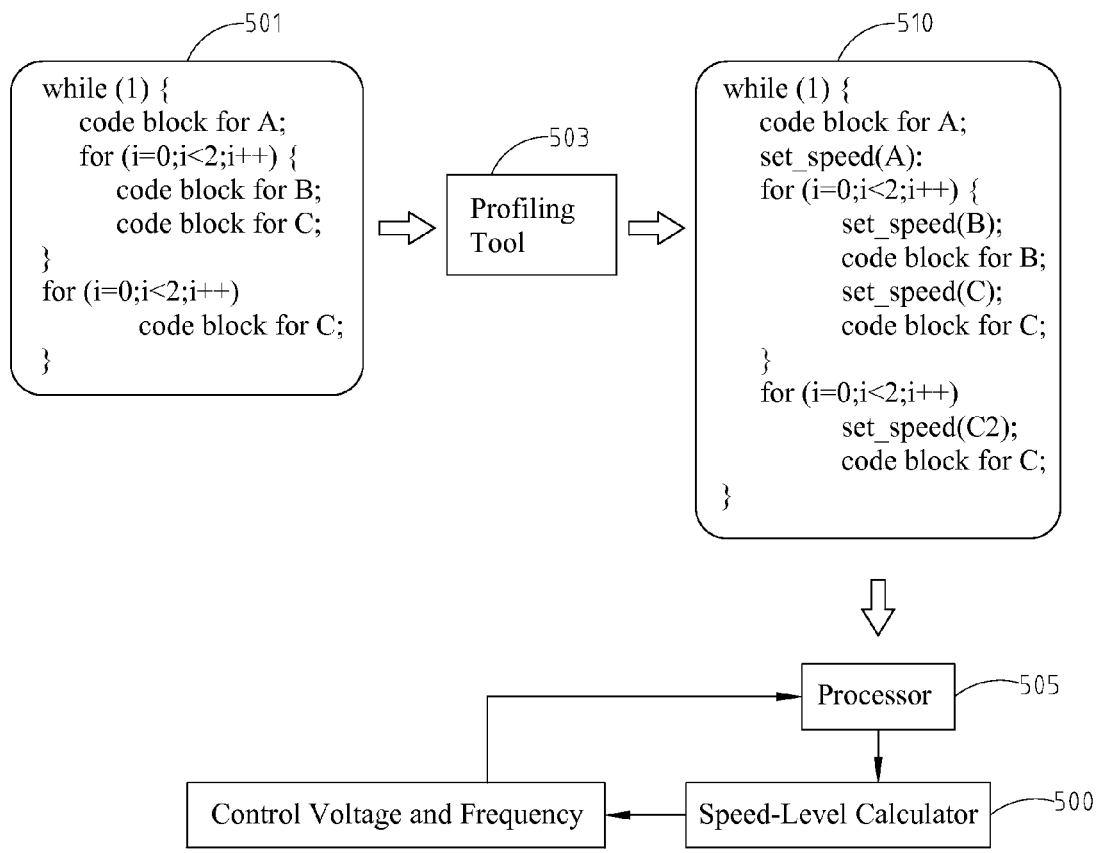
FIG. 5 shows a schematic view of an exemplary dynamic voltage scaling system using the speed-level calculator, consistent with certain disclosed embodiments.

FIG. 5 shows a schematic view of an exemplary dynamic voltage-scaling system deploying disclosed speed-level calculator 500, consistent with certain disclosed embodiments. Referring to FIG. 5, in the offline stage, a user program 501 uses an analysis tool 503 with an algorithm to obtain a run time control parameter, and inserts dynamic voltage scaling code, for example, set_speed(A), set_speed(B), set_speed(C) and set_speed(C2) into an application program 510. During the run time, the control parameter obtained in the offline stage is inputted to speed-level calculator 500 to compute the required speed level of CPU 505 according to the actual run time execution, and the voltage and frequency are scaled to control the operation speed of CPU 505.

Speed-level calculator 500, combined with offline profiling-based DVS algorithm, uses the hardware mechanism of the present invention to rapidly determine the CPU operation speed in run time so that the system may satisfy the performance requirement while keeping the CPU operation speed as low as possible to save power.

The following exemplary embodiments show the dynamic voltage scaling in a limited system resource and run time overhead situation. The disclosed embodiments finish most of the complicated operations in the offline stage to reduce the run-time overhead. For periodic tasks, the disclosed embodiments profile the data of each task in the offline stage as the input parameter to speed-level calculator 500.

Figure 1:
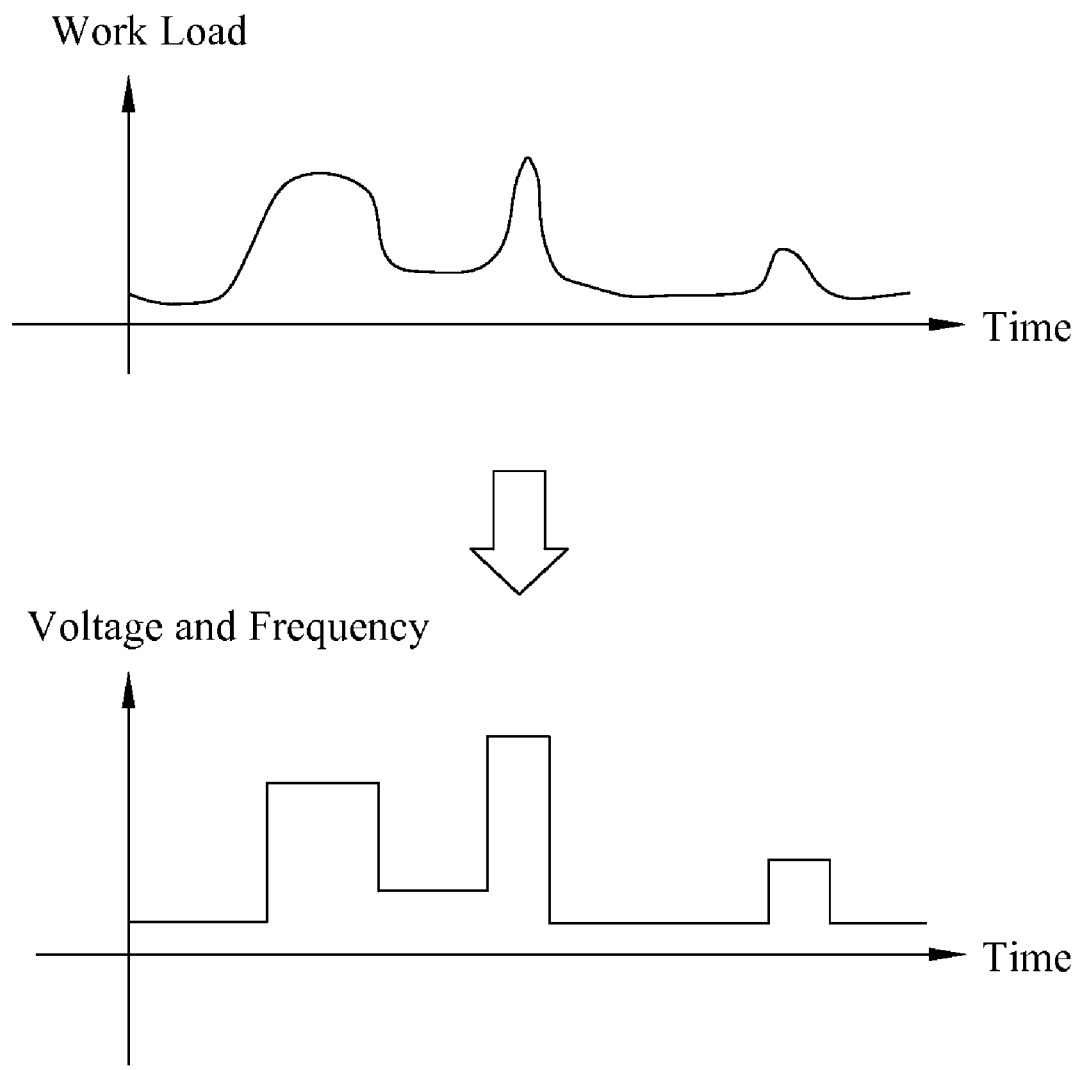
FIG. 1 shows a schematic view of an exemplary DVS.
Figure 2:
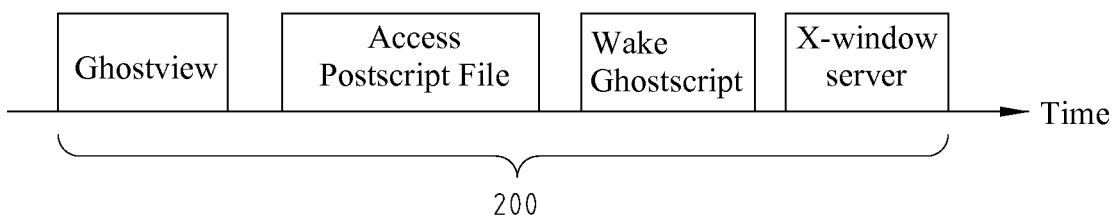
FIG. 2 shows an example illustrating the occurrence of an episode.
Figure 3:
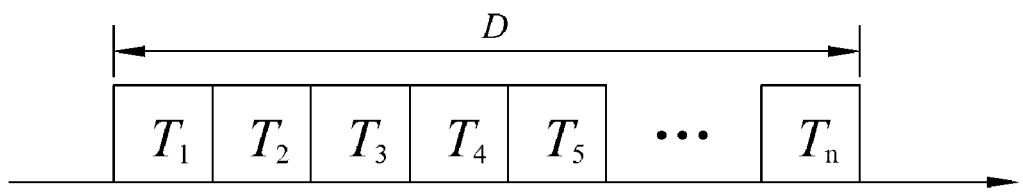
FIG. 3 shows an exemplary schematic view of a task model.
Figure 4:
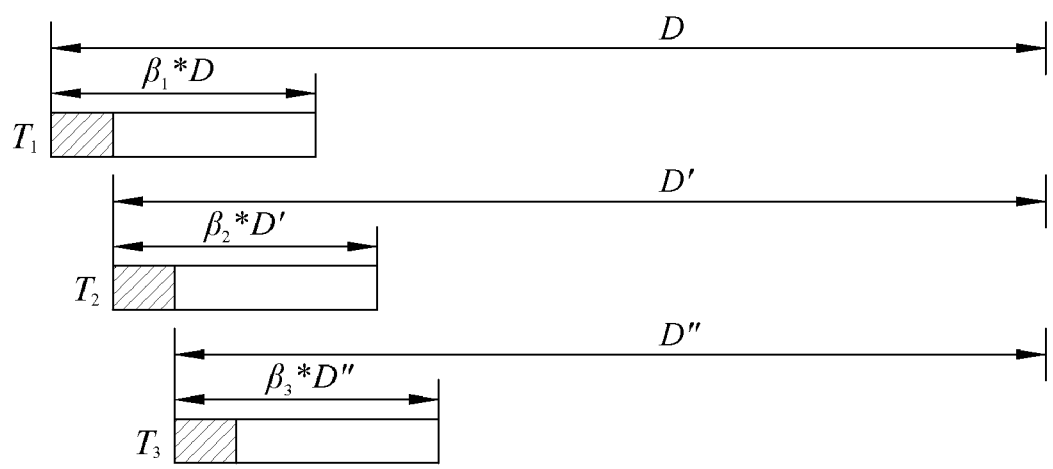
FIG. 4 shows a schematic view of an exemplary operation of a dynamic voltage scaling system.

The aforementioned R. Xu, et. al article "Minimizing expected energy in real-time embedded system" 2005 ACM International Conference on Embedded Software is the theoretical basis of the disclosed embodiments. FIGS. 3-4 show the data collected by offline profiling may be used to obtain the control parameter $\beta_i$ corresponding to each task $T_i$ to reduce the probability expectation of the energy consumption.

To realize the speed-level computation in the WSN-node with limited resource, it is necessary to implement a floating-point divider on the WSN-node if directly based on the clock frequency $f_i$ equation of task $T_i$, which leads to a large increase in the cost. In addition, because the levels of voltage and frequency scaling allowed in the dynamic voltage scaling processor are limited, the following exemplary embodiments may overcome the aforementioned disadvantages, simplify the hardware mechanism, remove the floating-point division and simplify the floating-point multiplication to an integer multiplication with low bit width.

Because parameter $\beta_i$ and number of execution periods $W_i$ may be obtained offline, $\alpha_i = \beta_i/W_i$ may also be obtained offline. The disclosed exemplary embodiments may change the computation of clock frequency $f_i$ of task $T_i$ to the computation of the clock period $$\tau_i = \left(\frac{\beta_i}{W_i}\right) D' = \alpha_i D'.$$

Therefore, only multiplication is required at run time.

In a system with limited resource, such as WSN-node, the floating-point multiplier may still be overly expensive hardware; therefore, the disclosed embodiments further simplify the floating-point multiplication to integer multiplication with low bit width.

Figure 6A:
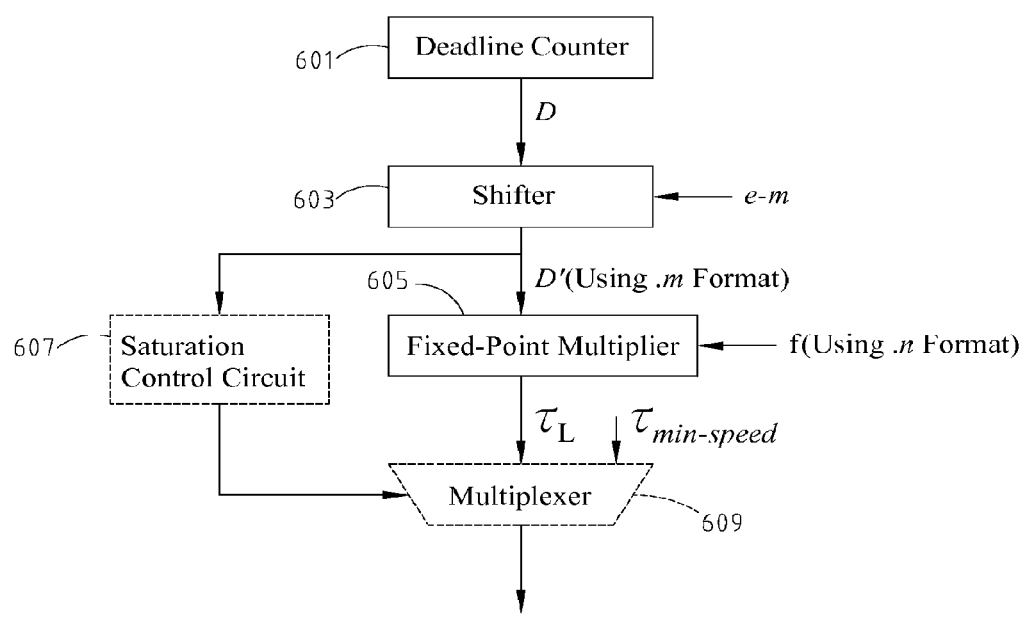
FIG. 6a shows a schematic view of an exemplary speed-level calculator for dynamic voltage scaling, consistent with certain disclosed embodiments.

FIG. 6a shows a schematic view of an exemplary speed-level calculator for dynamic voltage scaling, consistent with certain disclosed embodiments. Speed-level calculator 600 does not include any floating-point divider and simplifies the floating-point multiplication to multiplication with low bit width, applicable to system with limited resource, such as WSN-node.

Referring to FIG. 6a, speed-level calculator comprises a deadline counter 601, a shifter 603, and a fixed-point multiplier 605.

Figure 6B:
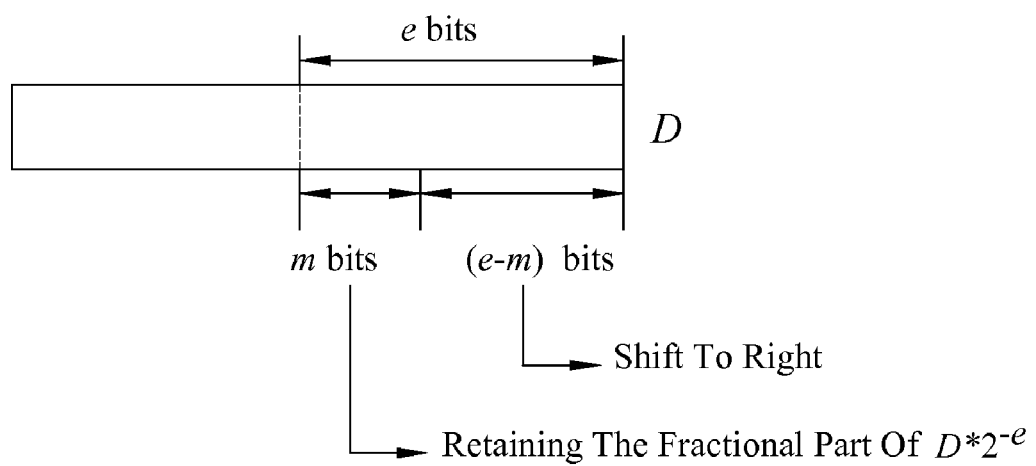
FIG. 6b shows an exemplary schematic view of computing from the residual time of the deadline for a period, consistent with certain disclosed embodiments.

Deadline counter 601 computes the residual time D to the deadline required to accomplish a series of related tasks. Shifter 603 shifts the residual time D to the right for e-m bits to obtain the value of $D'=(2^{-e}*D)$, rounded to the m bits after the decimal point, i.e., .m format, where e and m are both natural numbers, as shown in FIG. 6b.

Fixed-point multiplier 605 is to generate the product of the pre-computed ratio $\alpha_i$ of a task $T_i$ and the residual time to deadline D. The pre-computed ratio $\alpha_i$ is represented as $\alpha_i = (1+f*2^{-n})*2^{-e}$, where f is the n-bit fractional part and e is the exponent. The final product $\alpha_i*D$ may be expressed as $\alpha_i*D = (1+f*2^{-n})*(2^{-e}*D) = (1+f*2^{-n})*D'$, where D' is generated by the shifter 603. The fixed-point multiplier 605 takes f and multiplies with D' to get the product $\alpha_i*D$. The product is then rounded to take the integer part to get the discrete speed level $\tau_L$ for the control of processor voltage and frequency. The speed-level $\tau_L$ may be switched through a selector, such as multiplexer 609.

Speed-level calculator may further include a saturation control circuit 607 for detecting whether an overflow has occurred in the result $\alpha_i*D$ generated by multiplier 605. The detection is realized by checking whether most significant bits of D' are all zeros or not. When an overflow occurs in D', the processor is set to operate at the lowest available speed with clock period $\tau_{min\_speed}$.

Figure 7:
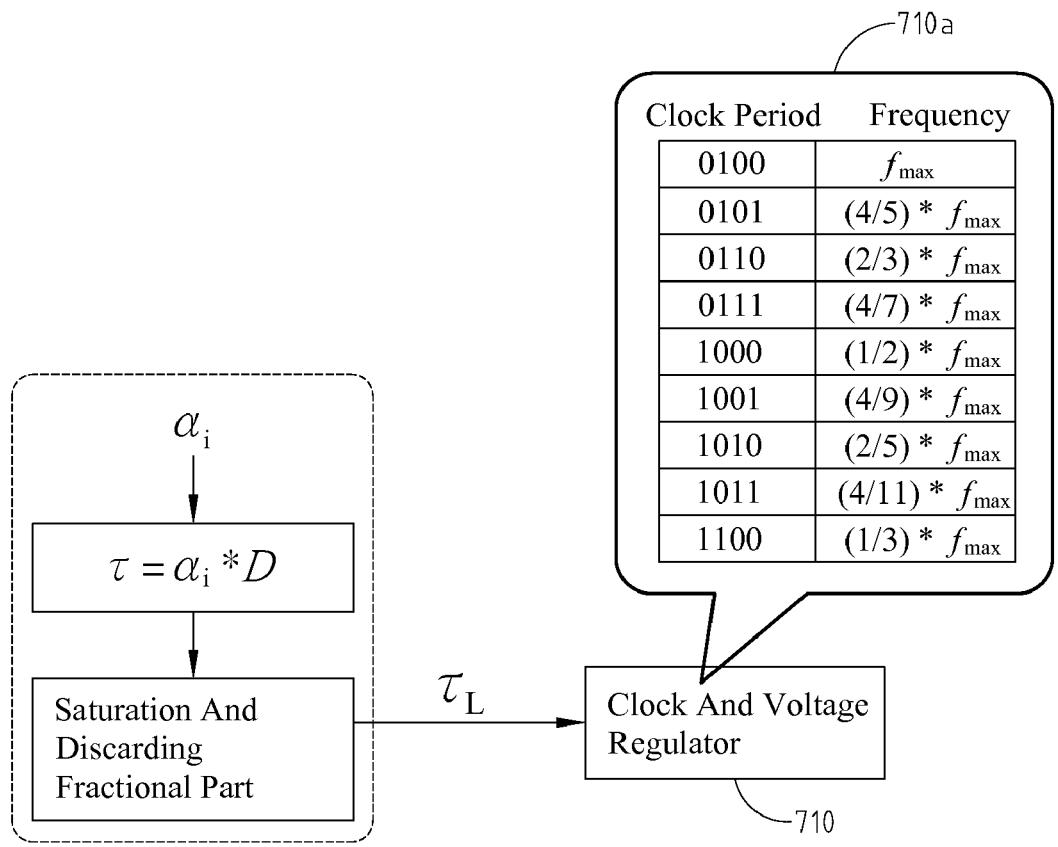
FIG. 7 shows a schematic view of an exemplary speed controlling method of the processor, consistent with certain disclosed embodiments.

FIG. 7 shows an exemplary schematic view of using discrete speed level to control processor speed, consistent with certain disclosed embodiments. In FIG. 7, according to each pre-computed $\alpha_i$, the multiplication of corresponding D' and $\alpha_i$ is performed to compute clock period $\tau_i = \alpha_i*D'$. The result $\tau_i$ is then saturated and fractional part is discarded to generate a corresponding discrete speed-level $\tau_L$. The speed-level $\tau_L$ is inputted to clock and voltage regulator 710 for scaling the voltage and frequency of the processor. Speed-level $\tau$ may be used directly as control signal to generate corresponding clock frequency and voltage.

Take the processor that supports less than 16 speed levels as an example. The integer part of the integer multiplication result will generate a 4-bit speed-level. For example, when clock period $\tau=1$, it means that the processor will switch to the first speed level; when clock period $\tau=2$, the processor will switch to the second speed level; and so on. The smaller the $\tau$, the shorter the clock period and the higher the processor speed.

Figure 8:
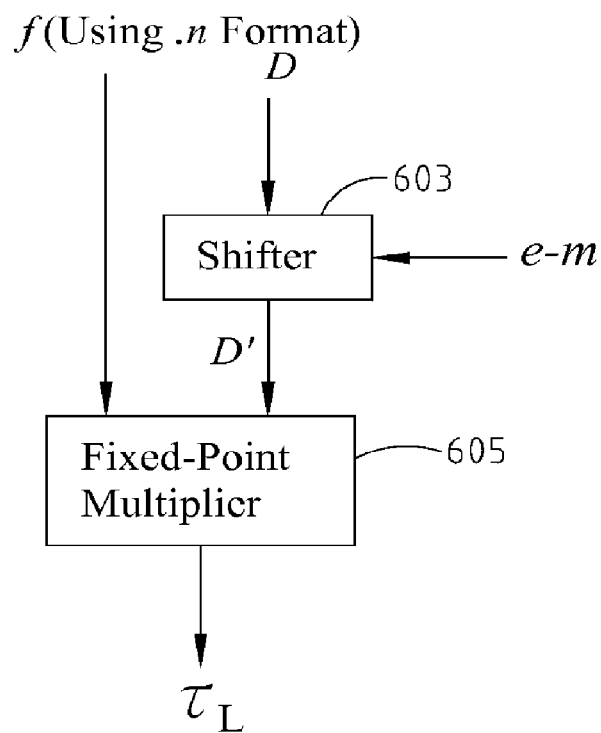
FIG. 8 shows a schematic view of an exemplary hardware structure for computing clock period $\tau_i=\alpha_i*D'$, consistent with certain disclosed embodiments.

The reason that the operation precision of the processor may be simplified lies in the limited number of speed levels of dynamic voltage scaling. For example, according to FIG. 7, when the processor has 16 speed levels, only 4-bit clock period $\tau_i$ must be computed. FIG. 8 shows a schematic view of an exemplary hardware structure for calculating clock period $\tau_i = \alpha_i*D'$, consistent with certain disclosed embodiments. In calculating $\tau_i = \alpha_i*D'$, $\alpha_i$ is a real number between 0 and 1. Therefore, real number $\alpha_i$ may be expressed as the fractional part f (with n bits) and integer part e, i.e., $\alpha_i \approx (1+f*2^{-n})*2^{-e}$, with exemplary recorded format shown as FIG. 9.

The exemplary hardware structure of FIG. 8 may include shifter 603 and fixed-point multiplier 605. The operation formula performed in the hardware structure is described as $\tau_i \approx (1+f*2^{-n})*2^{-e}*D$. The performed operation is described as follows. Shifter 603 shifts the input residual time D to the right for e-m bits to obtain the value of $D'=(2^{-e}*D)$, rounded to the m bits after the decimal point. D' is then inputted to fixed-point multiplier 605. Fixed-point multiplier 605, according to the fractional part f (i.e., .n format) of D' and $\alpha_i$, performs the multiplication $(1+f*2^{-n})*D'$. The integer k-bit part of result $\tau'$ from the multiplier is taken as the speed-level for scaling the processor voltage and frequency.

The extra precision in the computation will be discarded. The key to realize the above clock period calculation is to determine the fractional part (m and n bits) according to the speed-level bit number k and required precision, so that the precision requirements may be met by simplest hardware. Based on the error analysis theory, the disclosed embodiments provide reduced hardware speed-level calculator to calculate the required speed of the processor according to the speed-level bit number and required precision. In this manner, in a system with limited resource, such as WSN-node, the speed-level calculation may also be implemented.

According to the error analysis theory, the following describes the result of the error analysis of the present invention. Using $\tau$ as the exact error-free clock period, and $\tau'$ as the clock period generated by hardware of FIG. 8, the error of $\tau'$ generated by FIG. 8 will be within:

$$\tau - \tau' < D*2^{-n-e} + 2^{-m+1} + 2^{-n-m}$$

where n is the number of bits of the fractional part of $\alpha_i$, and m is the number of bits of the fractional part of the calculation $(D*2^{-e})$ of shifter 603. The range of the error may be proved by the following steps:

Step 1: rewriting the error-free clock period $\tau$ to:

$$\tau = a_i * D = (1 + f * 2^{-n} + E_\alpha) * 2^{-e} * (D'' * 2^{e-m} + E_D)$$

where $E_\alpha < 2^{-n}$ and $E_D < 2^{e-m}$.

Figure 9:
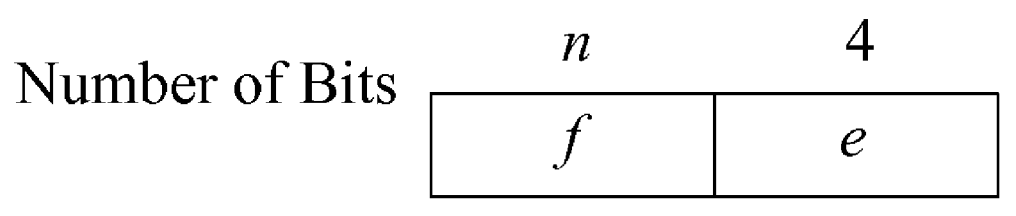

In step 1, $\alpha_i$ is a real number between 0 and 1, with the format divided into n-bit fractional part f and exponential part e. The approximation of $\alpha_i$ in FIG. 9 is $\alpha_i \approx 1 + f * 2^{-n}$, and the true value is $a_i = 1 + f * 2^{-n} + E_a$, where $E_a$ is the error that cannot be expressed in the n-bit fractional part, and $E_a < 2^{-n}$. The error of residual time D is estimated as follows. In the exemplary hardware structure of FIG. 8, shifter 603 shifts residual time D to the right for e bits, and rounds to m bits of the fractional part. Then, the result is multiplied with $1 + f * 2^{-n}$. Therefore, residual time D may be rewritten as $D = D'' * 2^{e-m} + E_D$, where $E_D$ is the shifted error, and $E_D < 2^{e-m}$. Hence, residual time D may be expressed as in FIG. 10.

Step 2: Clock period $\tau'$ calculated by the hardware of FIG. 8 may be expressed as follows:

$$\tau' = (1 + f * 2^{-n}) * 2^{-e} * (D'' * 2^{e-m})$$

where errors $E_\alpha$ and $E_D$ are neglected due to the limited number of bits of fractional part.

Step 3: Comparing the results of step 1 and step 2 to further calculate the error as follows:

$$\tau - \tau' = E_\alpha * D'' * 2^{-m} + (1 + f * 2^{-n}) * E_D * 2^{-e} + E_\alpha * E_D * 2^{-e}$$

Figure 10:
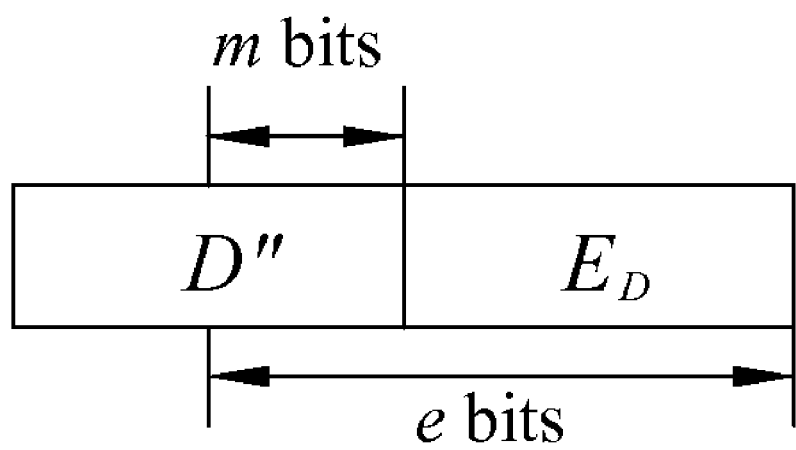
FIG. 10 shows an exemplary representation of residual time D, consistent with certain disclosed embodiments.

Then, according to $E_\alpha < 2^{-n}$ and $E_D < 2^{e-m}$, with $D'' < D * 2^{m-e}$ (refer to the decomposition and calculation error of residual time D in FIG. 10), the error range may be calculated as follows:

$$\tau - \tau' < D * 2^{-n-e} + 2^{-m+1} + 2^{-n-m}$$

Speed-level calculator 600 of FIG. 6a is designed according to the above error analysis theory and the speed-level bit number k and expected error range. Therefore, in addition to the hardware circuit for calculating $\tau_i = \alpha_i * D'$, speed-level calculator 600 further includes deadline counter 601. A saturation control circuit 607 may also be used for detecting whether an overflow will occur in the product $\tau_i = \alpha_i * D'$. However, the feature of the speed-level calculator of the present invention is how to define the fractional part (n and m) and the size of required fixed-point calculator 605 according to the error analysis theory. The following describes the rules of the control hardware complexity, and the design of deadline counter 601 and saturation control circuit 607.

The rule for control hardware complexity is summarized as follows. To calculate k-bit speed-level $\tau'$, with $\tau < 2^k$, and the calculation error is within the order of $2^{-p}$ according to the above error analysis theory, where p is the defined error tolerance parameter, then the selection rule of the precision of each part is as follows:
(1) number of bits n for the fractional part of $\alpha_i$ is n=k+p+1;
(2) number of bits m for the fractional part selected by shifter (D>>e) is m=p+2; and
(3) the size for the required fixed-point multiplier is (k+p+2)*(k+p+2). This is because $\alpha_i$ has n+1 bits, and (D>>e) takes k bits of integer part and m bits of fractional part (=k+m), therefore, the size of the multiplier is (n+1)*(k+m)=(k+p+2)*(k+p+2).

According to the above rule, when residual time $D \leq 2^{k+e}$ (i.e. $\tau < 2^k$, indicating no overflow in clock period), the calculation error is within the range $\tau - \tau' \leq 2^{-p} + 2^{-k-2p-3}$ according to error analysis theory.

Figure 11:
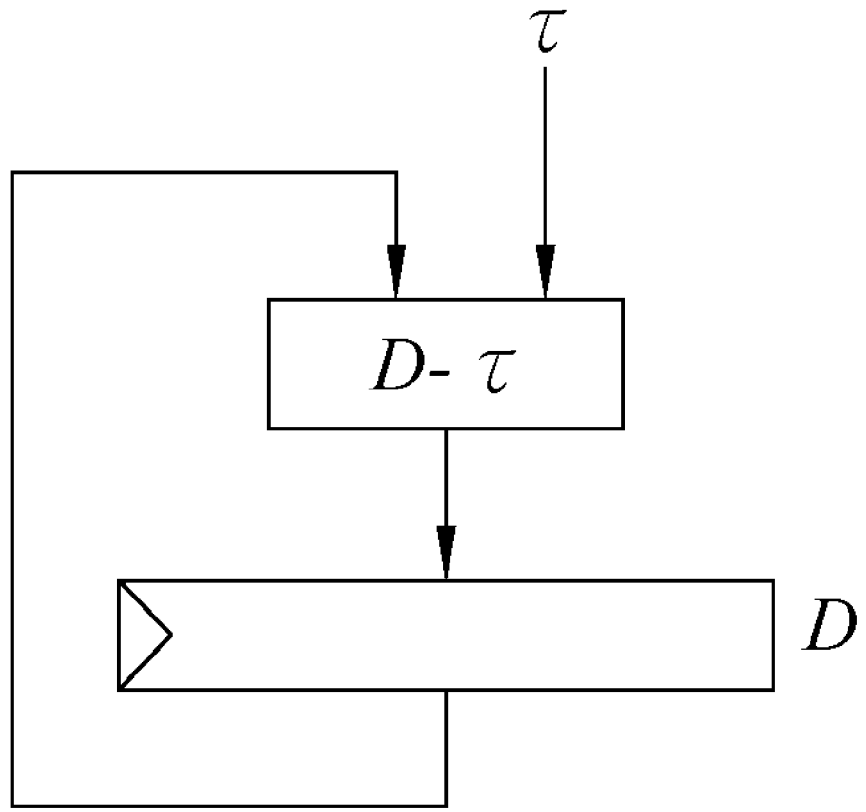
FIG. 11 shows a schematic view of an exemplary structure of the deadline counter, consistent with certain disclosed embodiments.

FIG. 11 shows a schematic view of an exemplary structure of the deadline counter, consistent with certain disclosed embodiments. Deadline counter 601 may use a count-down counter to calculate the residual time of the deadline of finishing a series of tasks. Referring to FIG. 11, because the operating frequency of the dynamic voltage scaling system is not fixed, it is necessary to take the operating frequency of the system at that time into account when calculating the decreasing residual time. When the system speed level is set as $\tau$, the clock period is $\tau$ time units. Therefore, deadline counter 601 decrements by $\tau$ in each period.

Speed-level calculator 600 of FIG. 6a may further include a saturation control circuit 607 for handling the overflow. When the calculated clock period exceeds k bits expressive range (clock period $\tau \geq 2^k$), an overflow has occurred. The operation speed of the processor is set as the lowest possible speed provided by the processor (clock period $\tau = 2^k - 1$). The method for detecting overflow by saturation control circuit 607 is described as follows.

According to the clock period calculation:

$$\tau \geq \tau' = (1 + f * 2^{-n}) * 2^{-e} * D \geq D * 2^{-e}$$

Figure 12:
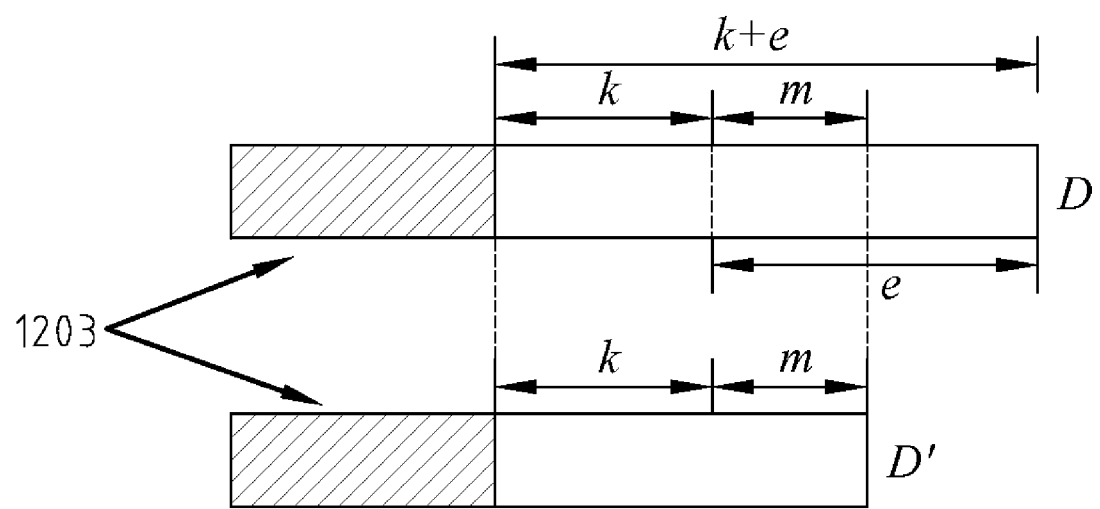
FIG. 12 shows a schematic view of an exemplary saturation detection method, consistent with certain disclosed embodiments.

When $D \geq 2^{k+e}$, it means that the calculation result of above clock period equation will overflow. In actual implementation, the overflow may be determined by detecting whether the part higher than (k+m) bits of $D' = (D >> e)$ is entirely 0. FIG. 12 shows a schematic view of an exemplary saturation detection method, consistent with certain disclosed embodiments. Referring to FIG. 12, when part 1203 of higher bits of D' and D is not entirely 0, an overflow will occur at the product $\tau$. At this condition, the processor operation speed is set to the lowest speed. Saturation control circuit 607 may be implemented with an OR gate circuit applied to the bits higher than (k+m) bits of D'.

Figure 13:
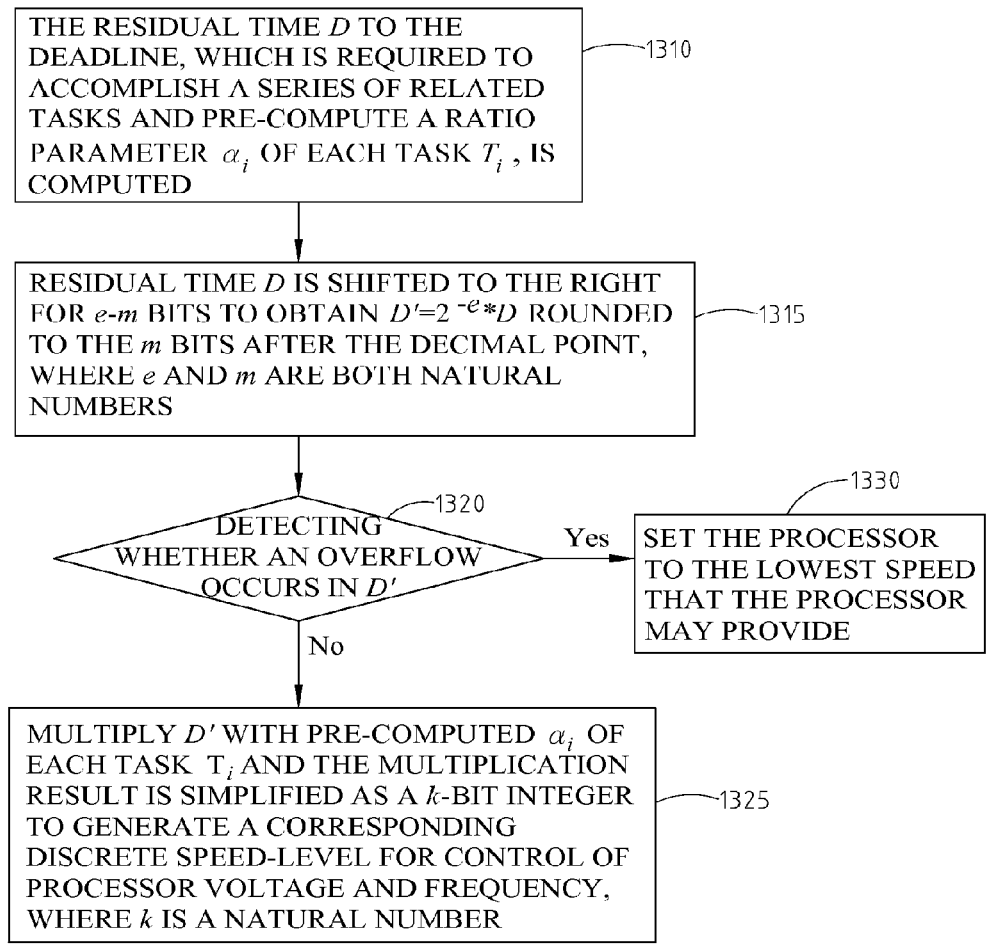
FIG. 13 shows a schematic view of an exemplary speed-level calculating method for dynamic voltage scaling, consistent with certain disclosed embodiments.

FIG. 13 shows a schematic view of an exemplary speed-level calculating method for dynamic voltage scaling, consistent with certain disclosed embodiments. In step 1310, the residual time D to the deadline, which is required to accomplish a series of related tasks and pre-compute a ratio parameter $\alpha_i$ of each task $T_i$, is computed. As aforementioned, $$\alpha_i = \frac{\beta_i}{W_i},$$

where $\beta_i$ is the control parameter for task $T_i$ execution at run time, and $W_i$ is the worse-case execution cycles of task $T_i$. $\alpha_i$ may be pre-computed offline, and it is a real number between 0 and 1. $\alpha_i$ may be expressed as an n-bit fractional part f and exponential part e; i.e., $\alpha_i \approx (1 + f * 2^{-n}) * 2^{-e}$.

In step 1315, residual time D is shifted to the right for e-m bits to obtain the value of $D' = (2^{-e} * D)$, rounded to the m bits after the decimal point, where e and m are both natural numbers. In step 1320, whether an overflow occurs in D' is detected. As aforementioned, when no overflow occurring in the k-bit speed-level, the allowable computational error is within the order of $2^{-p}$, where p is a defined error tolerance parameter. Therefore, the precision selection rule of each part may be defined as follows: number of bits for the fractional part of $\alpha_i$ is n=k+p+1; number of bits of the fractional part of $2^{-e} * D$ is rounded to m=p+2; and the size of the required multiplier is (k+p+2)*(k+p+2).

When no overflow occurs in D', as shown in step 1325, it is to multiply D' with pre-computed $\alpha_i$ of each task $T_i$ and the multiplication result is simplified as a k-bit integer to generate a corresponding discrete speed-level for control of processor voltage and frequency, where k is a natural number. When overflow occurs in D', as shown in step 1330, it is to set the processor to the lowest speed that the processor may provide.

Figures 14A, 14B:
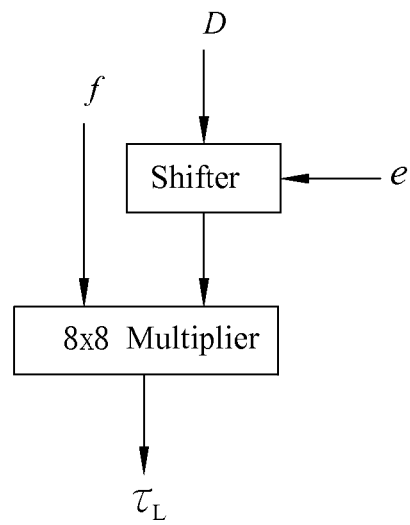
FIG. 14A shows a schematic view of an exemplary speed-level calculator with less than 16 speed levels, consistent with certain disclosed embodiments.
FIG. 14B shows an exemplary design of clock period $\tau_i$ and corresponding frequency f of each speed level of FIG. 14A.

FIG. 14A shows an exemplary speed-level calculator with less than 16 speed levels, consistent with certain disclosed embodiments. The following describes the application of the aforementioned method to the design of the speed-level calculator. First, the time unit is normalized. Let variable $\tau_{max\text{-}speed}$ be the clock period at the highest operation speed, normalization of the time unit is as follows:

$$1 \text{ time unit} = (1/4)*\tau_{max\text{-}speed}$$

That is, when the calculated clock period is 4, the processor operated at the highest speed.

Because the clock period is reversely proportional to the frequency, the equation of frequency f corresponding to clock period $\tau_i$ is as follows:

$$\frac{f}{f_{max}} = \frac{1/\tau}{1/\tau_{max\text{-}speed}} \Rightarrow f = \frac{\tau_{max\text{-}speed}}{\tau} f_{max}$$

The frequency f corresponding to each speed level may be calculated, as shown in FIG. 14B, where $f_{max}$ is the frequency corresponding to clock period at 4.

Then, calculation precision required for the speed-level calculator is selected. Because the speed-level calculating method of the disclosed embodiments according to the present invention is to compute the clock period and then takes only the integer part with discarding the fractional part, the error is less than 1. In the disclosed embodiment of FIG. 14A, the error parameter p is set to be 2; i.e., the error is within about the order $2^{-2}=1/4$. According to the aforementioned error analysis theory, the number of the speed levels and the required size of the fixed-point multiplier are $(k+p+2)*(k+p+2)$. FIG. 15 shows an exemplary relation between the number of speed levels and the required size for fixed-point multiplier.

The embodiment in FIG. 14A has less than 16 speed levels; i.e., k=4. The required size for the multiplier is $(4+2+2)*(4+2+2)$; i.e., an 8×8 multiplier. The 8×8 fixed-point multiplier may be constructed with four carry save adders (CSA). The width of each CSA is less than 11 bits, and each CSA may be implemented with less than 2 k gate-count. The speed-level calculation can be accomplished in two clock cycles.

Therefore, the speed-level calculator and calculating method of the present invention, through offline profiling, may calculate the required operation speed with low system load to control the voltage and frequency of the processor according to the control parameter obtained offline and the run time situation.

The present invention eliminates the use of the floating-point multiplication and simplifies the floating-point multiplication to integer multiplication with low bit width. Furthermore, through error analysis theory to know the relation between the speed-level calculation error and the hardware complexity, the present invention uses the reduced hardware to calculate the required operation speed and the speed level of each run time period to scale the operation speed of the processor at run time.

Although the present invention has been described with reference to the exemplary disclosed embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A speed-level calculator for dynamic voltage scaling, applicable to a processor with a plurality of speed levels, said speed-level calculator comprising:
a deadline counter that computes a residual time D of deadline for accomplishing a series of related tasks;
a shifter that shifts said residual time D to the right for e-m bits to obtain a real number $D'=(2^{-e}*D)$, rounded to m bits after the decimal point of D', where e and m are both natural numbers; and
a fixed-point multiplier, according to a pre-computed ratio parameter $\alpha_i$ of each task $T_i$, for multiplying D' with $\alpha_i$, and simplifying the multiplication result as a k-bit integer to generate a corresponding discrete speed-level with an error within an order of $2^{-p}$ for control of voltage and frequency for said processor, where k and p are natural numbers;
wherein p is a defined error tolerance parameter with e being pre-computed, k is a number of bits required for representing the plurality of speed levels, and n is a nature number representing a number of bits in a fractional part of said $\alpha_i$ with n=k+p+1, and m=p+2.

2. The speed-level calculator as claimed in claim 1, said speed-level calculator further includes a saturation control circuit for detecting whether the corresponding discrete speed-level of said D' exceeds k bits.

3. The speed-level calculator as claimed in claim 2, wherein said saturation control circuit is realized with an OR gate circuit.

4. The speed-level calculator as claimed in claim 2, wherein the corresponding discrete speed-level is determined to exceed k bits when the bits of said D' higher than (k+m) bits are not entirely 0.

5. The speed-level calculator as claimed in claim 1, wherein said deadline counter is a count-down counter and is decremented according to the operating frequency of said processor.

6. The speed-level calculator as claimed in claim 1, wherein said ratio parameter $\alpha_i$ equals to $\beta_i/W_i$, where $\beta_i$ is a control parameter corresponding to task $T_i$, and $W_i$ is worse-case execution cycles of task $T_i$.

7. The speed-level calculator as claimed in claim 1, wherein said k-bit integer is obtained by saturating the multiplication result of said D' and $\alpha_i$ and discarding the fractional part of the multiplication result.

8. The speed-level calculator as claimed in claim 1, wherein said ratio parameter $\alpha_i$ is a real number between 0 and 1, and $\alpha_i$ is represented as $\alpha_i \approx (1+f*2^{-n})*2^{-e}$, wherein f is the n-bit fractional part of said $\alpha_i$ with the pre-computed e as an exponential part of said $\alpha_i$.

9. The speed-level calculator as claimed in claim 1, wherein the number of bits required for said fixed-point multiplier is $(k+p+2)*(k+p+2)$.

10. A speed-level calculating method implemented in control hardware for dynamic voltage scaling, applicable to a processor with a plurality of speed levels, said method comprising:
computing a residual time D of deadline to accomplish a series of related tasks, and re-computing a ratio parameter $\alpha_i$ of each task $T_i$;
shifting said residual time D to the right for e-m bits to obtain a real number $D'=(2^{-e}*D)$, rounded to m bits after the decimal point of D', where e and m are both natural numbers;

detecting whether a saturation condition in D' exists;

multiplying D' with $\alpha_i$, and simplifying the multiplication result as a k-bit integer to generate a corresponding discrete speed-level with an error within an order of $2^{-p}$ for control of voltage and frequency for said processor if the saturation condition in D' does not exist, where k and p are natural numbers; and setting said processor to the lowest speed provided by said processor if the saturation condition in D' exists;

wherein said control hardware includes a shifter for shifting D and a fixed-point multiplier for multiplying D' with $\alpha_i$ and a saturation control circuit for determining whether the saturation condition in D' exists for performing the above steps, p is a defined error tolerance parameter with e being pre-computed, k is a number of bits required for representing the plurality of speed levels, and n is a nature number representing a number of bits in a fractional part of said $\alpha_i$ with n=k+p+1, and m=p+2.

11. The method as claimed in claim 10, wherein said ratio parameter $\alpha_i$ is pre-computed offline.

12. The method as claimed in claim 10, wherein said ratio parameter $\alpha_i$ equals to $\beta_i/W_i$, where $\beta_i$ is a control parameter corresponding to task $T_i$, and $W_i$ is worse-case execution cycles of task $T_i$.

13. The method as claimed in claim 10, wherein the number of bits required for said fixed-point multiplier is (k+p+2)*(k+p+2).

14. The method as claimed in claim 10, wherein said simplifying said multiplication result as a k-bit integer further includes saturating said multiplication result of D' and $\alpha_i$ and discarding the fractional part of said multiplication result.

15. The method as claimed in claim 10, wherein said saturation condition exists when the bits of D' higher than (k+m) bits are not entirely 0.

16. The method as claimed in claim 10, wherein said control of voltage and frequency for said processor uses a clock and voltage regulator with an input discrete speed-level as a control signal for generating corresponding voltage and frequency.

* * * * *